United States Patent

[11] 3,613,889

| [72] | Inventor | Sherwood Reed<br>Norwich, Vt. |
|---|---|---|
| [21] | Appl. No. | 46,712 |
| [22] | Filed | June 16, 1970 |
| [45] | Patented | Oct. 19, 1971 |
| [73] | Assignee | The United States of America as represented by the Secretary of the Army |

[54] FLOATING SETTLER FOR SEPARATION OF LIQUID AND SOLID PHASES
3 Claims, 2 Drawing Figs.

[52] U.S. Cl. ........................................... 210/84,
210/242, 210/522, 210/540
[51] Int. Cl. ........................................... B01d 21/00
[50] Field of Search ........................................... 210/84,
242, 521, 522, 538, 540

[56] References Cited
UNITED STATES PATENTS

| 3,482,694 | 12/1969 | Rice et al. ...................... | 210/84 X |
| 3,534,858 | 10/1970 | Harrington ...................... | 210/242 |

*Primary Examiner*—John Adee
*Attorneys*—Harry M. Saragovitz, Edward J. Kelly, Herbert Berl and Lawrence E. Labadini ABSTRACT: In a system for separating a clear liquid phase from a combined liquid and solid phase mixture in a sedimentation container wherein the mixture is caused to pass upwardly through a bundle of parallel inclined tubes within which the settling of the solid phaseout of the liquid phase is completed with the clear liquid phase passing out of the top of the tubes into a collecting vessel from which the clear liquid is then drained, the improvement comprising floating said bundle of inclined tubes within the liquid mixture so that the clear liquid phase may be removed from the system at a steady uniform rate despite changes in the liquid level in the sedimentation container.

PATENTED OCT 19 1971
3,613,889
Fig.1.
Fig.2.
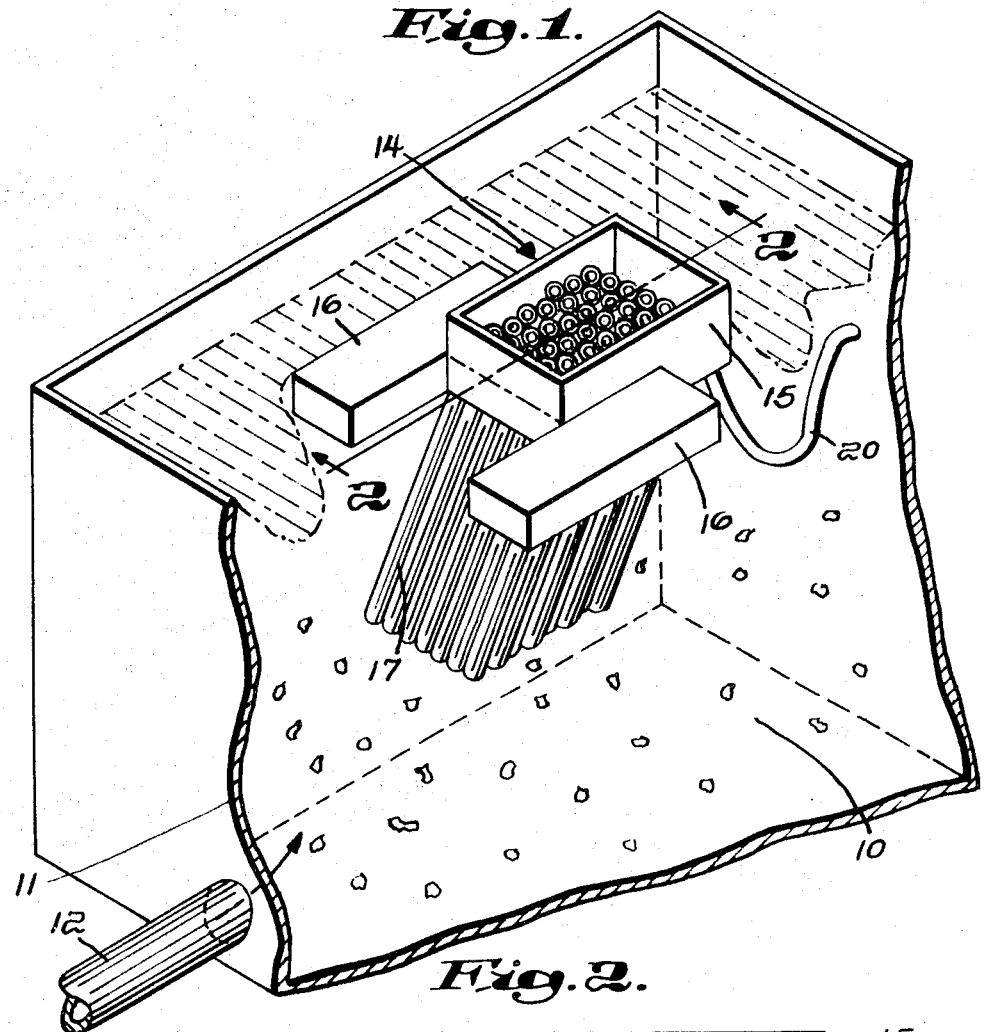
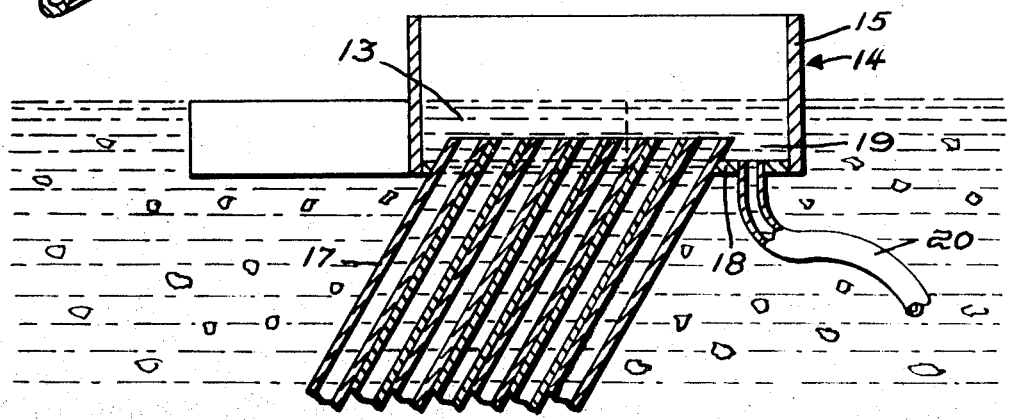
Inventor:
Sherwood Reed,
by: Harry M. Saragovitz,
Edward J. Kelly, Herbert Berl &
Lawrence E. Labadini,
Attorneys

FLOATING SETTLER FOR SEPARATION OF LIQUID AND SOLID PHASES

The invention described herein may be manufactured, used, and licensed by or for the Government for governmental purposes without the payment to me of any royalty thereon.

BACKGROUND OF THE INVENTION

This invention relates broadly to the separation of a liquid phase from a solid phase dispersed therein, often a critical step in many industrial processes. This separation is especially critical in water and sewage treatment processes where the separation of solid particles is accomplished by gravity sedimentation in properly sized basins and tanks. To meet the high standards being established for sewage waste disposal and to cope with the increasing rate of water use, it is necessary that efficient, high-rate, treatment systems be developed and especially improved liquid-solid phase separation systems.

Classical sedimentation theory leads through a valid series of arguments to prove that theoretically the efficiency of a settling basin is independent of depth. Design is, therefore, based on particle settling velocity, volumetric rate of flow and basin surface area. In actual fact, depth has a very basic significance in that it controls the type of particle that will be removed in a given retention time. In a typical rectangular basin with:

depth = $h$
surface area = $A$
volume = $Ah$
rate of flow = $Q$
retention time = $t = Ah/Q$
particle settling velocity = $V$, A particle with a settling velocity greater than $h/t$ will be removed, particles with a less velocity can pass out of the basin with the effluent stream. If an array of parallel trays could be installed in the basin with a vertical $h_s$ between trays, where:

$$h_s = V_s T$$

and $V_s$ = settling velocity of slowest moving particle in the mixture, then all particles could be completely removed. The advantages of tray systems can be clearly demonstrated in terms of retention time. If an assumed particle requires 1 hour to settle 2 feet in a conventional basin, it will also be removed in one-half hour by impinging on a tray placed at a 1 foot depth. This one tray can theoretically double the capacity of the basin. A multiple array of trays will, therefore, increase capacity by a direct ratio.

The advantages of shallow tray sedimentation have long been recognized. However, very significant practical problems have limited application. Chief among these problems is a means to efficiently remove the settled sludge from each of the trays. In an early example appearing in Great Britain in the 19th century, there were installed multiple layers of flat slate supported by small spacer blocks in a conventional rectangular basin. The cleaning problem was solved by periodically dismantling the entire bed by hand and then rebuilding it. Labor costs for this operation are obviously extremely high. Many subsequent attempts were made to incorporate the tray concept in an efficient, mechanical clean unit. Most were either too complex or marginally successful and none received widespread acceptance.

A recent development incorporated the tray principle in a context which promises both economy and efficiency in construction and operation. The application consists primarily of a bundle of parallel, inclined tubing through which the liquid-solid mixture flows. Since the distance from crown to invert, that is, the effective vertical height of each tube is measured in terms of inches, the advantages of the shallow tray sedimentation are present. The sidewalls of the tubing eliminate stray lateral currents and assist in the rapid damping of fluid turbulence to provide laminar flow conditions at low Reynolds numbers in the tube. Removal of settled material is accomplished by hydraulically backflushing or by steeply inclining the tubing so the settled material slides out by gravity.

While this "tube settler" bundle efficiently and economically removes clear liquid from the mixture, the separator system must nevertheless be designed to accommodate total periodic flows or inputs over the desired retention time. In extended aeration systems, for example, the aeration chamber generally has a volume equivalent to the total daily flow. In most systems, this flow is not received at a steady uniform rate, but occurs in surges reflecting water-use habits of the consumers. These peak-flow surges can, for short periods, commonly exceed 200 percent of the average rate. This problem becomes increasingly critical in inverse proportion to the size of the treatment unit. Very large treatment works obtain some damping benefits from the extensive pipe collection system and in some cases include surge tanks or temporary holding tanks.

This factor is especially significant for fixed position tube settler systems since flow velocity in the tubes is a very critical parameter. A fixed tube system must be designed to accept peak flows. This means either an increase in the number of tubes or an increase in tube length to provide adequate retention time with peak velocity conditions. The result is a tube system with an inefficient excess capacity that is required only during peak periods.

SUMMARY OF THE INVENTION

This invention relates to an improved system and method for separating a liquid phase from a mixture of solid and liquid phases and, more particularly, to a system imploying a tube settler which is designed to float on the surface of the liquid-solid mixture and to discharge clear liquid at a uniform flow rate comparable to the average input rate. Because of the uniform discharge rate, the size of the sedimentation or treatment tanks can be reduced and the number of tubes in the tube settler can be reduced.

BRIEF DESCRIPTION OF THE DRAWINGS

FIG. 1 is a perspective view illustrating the improved floating tube settler of this invention in a tank containing a liquid-solid mixture;

FIG. 2 is a view partially in section along the lines 2—2 of FIG. 1.

DESCRIPTION OF THE PREFERRED EMBODIMENTS

FIG. 1 illustrates an embodiment of this invention where a liquid-solid mixture 10 enters a sedimentation container 11 through an inlet pipe 12. The container is sized so as to accommodate any unusual peak-flow surges into the container. The expression sedimentation container, as used herein refers to any container adapted to hold the liquid-solid mixture and includes treatment tanks or containers. Clear liquid 13, devoid of any solids, is removed from the liquid-solid mixture through a liquid phase collector, designated generally as 14. The liquid phase collector consists of a liquidtight vessel 15 or collector box, which is shown floating to the surface of the liquid-solid mixture. Floats 16 on either size of the vessel support the same at a preset depth in the liquid mixture. Extending downwardly from the bottom of said vessel are a plurality of cylindrical, hollow, open-ended tubes 17 which are cemented together to form a unitary bundle of tubes. The tubes in the bundles are of equal length and the top openings of the tubes, extends into the vessel 15, as can be clearly seen in FIG. 2. The spaces between the tubes are sealed and the tubes mounted to the floor of the vessel so that the liquid may only enter the vessel 15 through the open ends at the top of the tubes 17. A collecting shelf area 19 is shown at one end of the vessel 15 and aids in the collection of the effluent liquid discharged by the tubes. A flexible effluent discharge conduit 20 carries a clear liquid stream from the vessel 15 to the outside of the sedimentation container 11.

The bundle of tubes 17 is fixed to said vessel so that the tubes will be positioned in the liquid-solid mixture at an inclined angle with respect to the vertical axis of the container. The net effect of this inclination is to shorten the vertical height from the crown to the invert of each tube to a matter of inches. At such a relatively short vertical height, the solid particles can settle out of the solution rapidly. The length of the tubes can vary within rather wide limits with lengths of four feet or more found to be suitable. Longer lengths will increase the expense of the device and will make the structure more awkward to handle and more difficult to accommodate within sedimentation tanks. Lengths shorter than 2½ feet have been found to be satisfactory and with proper flow velocity allowing the solid particles to settle to the bottom of the tube, there is no reason why tube lengths as short as one foot would not be operable. The angle of inclination of the tubes can similarly vary within wide limits. As the angle approaches the horizontal, the effective vertical height between the walls of the tube decreases and as the angle approaches the vertical, the effective distance between the walls of the tube increases. Inclination angles varying from 15° to 75° from the horizontal are operable for purposes of the present invention, but it is preferred to employ inclination angles from 30° to 60°.

It is essential that the vessel float within the liquid-solid mixture to a depth that will position the top of the tubes just below the general level of the liquid surface in the container 11 as is shown in FIG 2. With the tubes thus positioned, the liquid-solid mixture will flow upwardly from the bottom of each tube and out the top into the vessel 15. Each tube acts as a shallow tray and given the proper flow velocity, there is time for the solid particles to settle to the lower face or surface of the tube. The flow rate through the tubes is dependent on the position of the tops of the tubes in relation to the surface level of the liquid mixture in the container, with deeper submergence resulting in higher flow rates.

As has been noted, the sedimentation container is designed with sufficient freeboard to accommodate peak flows of liquid-solid mixture. Since the liquid phase collector 14 floats on the surface of the mixture, the tubes are maintained in a constant position relative to the liquid-solid mixture surface and the liquid phase separation system can be designed to discharge at a uniform flow velocity comparable to the average periodic input rate of the mixture. The result is a compact, economical device which achieves maximum efficiency, in that unlike the prior art "tube settlers," fixed in place to the container, this device functions on a continuous basis despite normal variations in the liquid level in the sedimentation container.

Further advantages resulting from the use of the floating "tube settler" of this invention include complete elimination of the separate sedimentation tanks and appurtenant equipment which can represent up to one-third of the cost of existing extended aeration treatment sewage systems. For cold regions, there are distinct advantages since the liquid phase collector or "tube settler" is suspended in the large body of liquid in the main tank which is exposed to warm, raw sewage, warm air aeration and constant agitation and therefore needs no special protection against freezing. Since the liquid phase collector floats, this device is always accessible for cleaning and maintenance when required.

The floating liquid phase collector of this invention may also be used in connection with other types of sewage treatment systems such as aerated lagoons which are popular in cold regions and qualify as secondary treatment systems meeting regulatory standards. The aerated lagoon is a relatively shallow basin under a continuous gentle aeration where retention time is measured in days instead of hours and size in terms of acres instead of square feet. Reduction in retention time or size would be advantageous. Shorter times require higher aeration rates which can be readily and economically achieved, but higher aeration rates would require a positive and rapid technique for solids separation. Use of the floating liquid phase collector of this invention would accomplish the desired separation at low cost.

It is obvious that the liquid phase separator and technique for its use described herein can also be used to separate liquid and solid phases of mixtures where the solids would normally settle out of the liquid in response to the effect of gravity.

Having described my invention as related to the embodiment set out herein, it is my intention that the invention not be limited my any of the details of the description, unless otherwise specified, but rather be construed broadly within its scope as set out in the accompanying claims.

I claim:

1. In a system for separating a liquid phase from a solid phase dispersed therein, wherein a sedimentation container holds the liquid and solid phase mixture, and a liquid phase collector mounted in a fixed position within said container collects and removes the clear liquid phase when the liquid in the container reaches the collector, said collector comprising a liquid tight vessel having a bundle of parallel open-ended tubes attached to said vessel and extending from the interior of said vessel downwardly at an inclined angle into the liquid contents of the container, whereby as the level of liquid rises in said container, it passes through the tubes where the separation of liquid and solid phases is completed and the clear liquid phase passes out the top of said tubes into said vessel from which it is removed by conduit means to the exterior of said container, the improvement which comprises mounting said liquid phase collector on floating means adapted to maintain the tops of the tubes of said collector at a predetermined distance below the level of the surface of the liquid in said container whereby the clear liquid phase is removed from said container at a constant flow rate.

2. In a system according to claim 1 wherein said conduit means is a flexible conduit.

3. A process for separating a liquid phase from solid phase dispersing therein, which comprises the steps of
   a. introducing a combined liquid and solid phase mixture into a container,
   b. floating a bundle of parallel open-ended tubes at an inclined angle in the liquid contents of said container so that the top of the tubes is maintained in a position below the liquid level in the container, the top of said tubes being inclosed within a liquidtight vessel, whereby the liquid in the container is caused to flow through the tubes at a velocity which will permit the solid contents to settle against the walls of the tubes, and
   c. draining the clear liquid phase that passes out of the top of said tubes into said vessel from said vessel to the exterior of said container.